United States Patent [19]

Dhyanchand

[11] Patent Number: 5,239,454
[45] Date of Patent: Aug. 24, 1993

[54] STEPPED-WAVEFORM INVERTER UTILIZING MAIN AND AUXILIARY SUBINVERTERS

[75] Inventor: P. John Dhyanchand, Rockford, Ill.

[73] Assignee: Sundstrand Corporation, Rockford, Ill.

[21] Appl. No.: 800,779

[22] Filed: Nov. 27, 1991

[51] Int. Cl.$^5$ .............................................. H02M 1/12
[52] U.S. Cl. .......................................... 363/43; 363/72
[58] Field of Search ............................. 363/43, 71, 72

[56] References Cited

U.S. PATENT DOCUMENTS

| | | |
|---|---|---|
| 3,579,081 | 5/1971 | Bates . |
| 3,775,662 | 11/1973 | Compoly et al. . |
| 4,063,144 | 12/1977 | Hucker et al. . |
| 4,698,739 | 10/1987 | Paice ..................................... 363/71 |
| 4,775,923 | 10/1988 | Schmid ................................... 363/43 |
| 4,782,436 | 11/1988 | Gilliland ................................. 363/56 |
| 4,783,795 | 11/1988 | Yahata ................................... 378/105 |

FOREIGN PATENT DOCUMENTS

| | | |
|---|---|---|
| 557781 | 6/1957 | Belgium ................................. 363/43 |
| 192467 | 11/1983 | Japan ..................................... 363/43 |

*Primary Examiner*—William H. Beha, Jr.
*Attorney, Agent, or Firm*—Marshall, O'Toole, Gerstein, Murray & Borun

[57] ABSTRACT

An inverter for converting DC power into AC power includes first and second controllable switches which are alternately operated to produce first and second AC waveforms which are combined to form a composite AC waveform that assumes at least three different levels during a cycle of the AC power.

6 Claims, 4 Drawing Sheets

STEPPED-WAVEFORM INVERTER UTILIZING MAIN AND AUXILIARY SUBINVERTERS

TECHNICAL FIELD

The present invention relates generally to power converters, and more particularly to a stepped-waveform inverter for converting DC power into AC power.

BACKGROUND ART

Inverters are often used to convert DC power into AC power for one or more AC loads. For example, in a variable-speed, constant-frequency (VSCF) power conversion system, a brushless, synchronous generator converts variable-speed motive power produced by a prime mover into variable-frequency AC power. A rectifier converts the variable-frequency AC power into DC power and an inverter converts the DC power into constant-frequency AC power. The inverter may be of the stepped-waveform type that produces phase output waveforms each comprising a series of steps or levels. Typically, each phase output waveform is subdivided into six or a multiple of six conduction periods in each cycle of the output wherein the waveform assumes one of a plurality of constant levels in each conduction period.

Prior stepped-waveform inverters have utilized a plurality of three-phase subinverters coupled to a corresponding number of sets of primary windings of a summing transformer. Each set includes three phase windings connected together in either a delta or wye configuration. A secondary winding is inductively linked with each primary winding to form a plurality of sets of three-phase secondary windings. The secondary windings of the same phase are connected together in series to form three sets of series-connected windings. The series-connected windings are, in turn, connected together in a wye configuration.

The subinverters are operated to produce rectangular voltage waveforms that are applied to the sets of primary windings. Corresponding voltages are induced in the secondary windings and the voltages are summed owing to the series connection of the secondary windings to produce three-phase stepped-waveform output voltages. The output voltage of each phase comprises a 12-, 24- or 36-step waveform when two, four or six subinverters are used, respectively. A 24-step inverter of the above-described type is disclosed in Compoly et al., U.S. Pat. No. 3,775,662.

Stepped-waveform inverters produce harmonics that are more easily filtered than the harmonics present in a pulse-width modulated (PWM) output. Thus, the size and weight of a filter coupled to the inverter output may be reduced as compared with a PWM type of inverter. However, the summing transformer contributes significantly to the size and weight of the stepped-waveform inverter, and hence the decrease in size and weight in output filter is partially or fully offset by the increased size and weight of the inverter itself.

SUMMARY OF THE INVENTION

In accordance with the present invention, a stepped-waveform inverter dispenses with the need for a summing transformer, in turn reducing size and weight.

More particularly, an inverter for converting DC power supplied on a DC conductor into AC power having a series of cycles includes first and second controllable switches coupled between the DC conductor and an inverter output and means for operating the first and second switches. The operating means alternately operates the first switch to produce a first AC waveform which changes between different levels at a first time while the second switch is operated to produce a second AC waveform which changes between two different levels at a second time different from the first time. The first and second AC waveforms are combined at the inverter output to form a composite AC waveform which assumes three different levels during a cycle of the AC power.

In a more specific sense, the inverter of the present invention includes a main subinverter having an input coupled to DC conductors and an output and develops a series of cycles of a first multi-state AC waveform having a series of N steps during each cycle and an auxiliary subinverter having inputs coupled to the DC conductors and an output coupled to the main inverter output which develops a series of cycles of a second multi-state output waveform. The first and second AC waveforms are combined to produce a series of cycles of a composite multi-state waveform having a number of steps greater than N during each cycle thereof.

The inverter of the present invention does not require a summing transformer, and hence the overall size and weight of the inverter are desirably reduced.

DESCRIPTION OF THE PREFERRED EMBODIMENT

Figure 1:
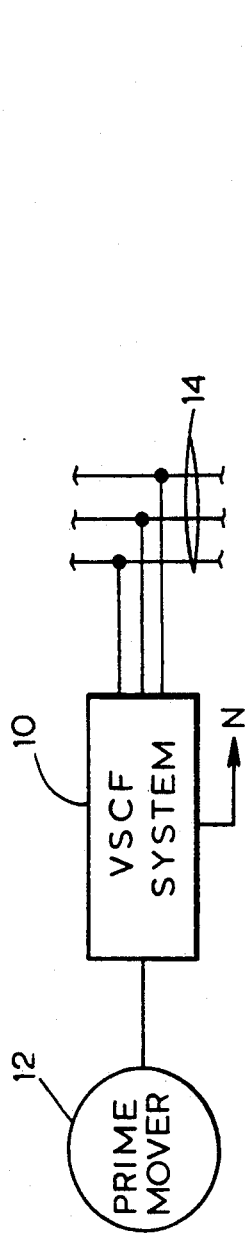
FIG. 1 comprises a block diagram of a prime mover in conjunction with a variable-speed, constant-frequency (VSCF) power conversion system.

Referring now to FIG. 1, a variable-speed, constant-frequency (VSCF) power conversion system 10 converts variable-speed motive power produced by a prime mover 12 into constant-frequency AC power which is supplied over a load bus 14 to one or more AC loads (not shown). It should be noted that various contactors interconnecting the VSCF system with the load bus 14 are not shown for the purpose of simplicity.

Figure 2:
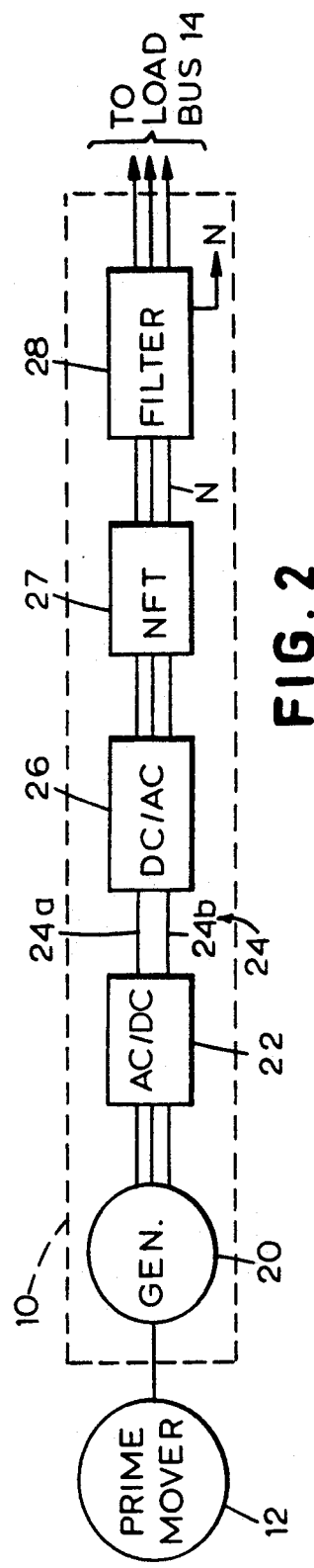
FIG. 2 comprises a more specific block diagram of the VSCF system of FIG. 1 in conjunction with the prime mover.

Referring now to FIG. 2, the VSCF system 10 includes a brushless, synchronous generator 20 which converts the variable-speed motive power produced by the prime mover 12 into variable-frequency AC power. An AC/DC converter or rectifier 22 converts the variable-frequency power into DC power on a DC link 24 comprising DC link conductors 24a, 24b. The DC power is converted by a DC/AC converter or inverter 26 according to the present invention into three-phase, constant-frequency AC power. A neutral N for the constant-frequency AC power may be obtained by a neutral forming transformer (NFT) 27 and filtering may be effected by an optional filter 28. The resulting AC power is supplied to the AC load bus 14.

Figure 3:
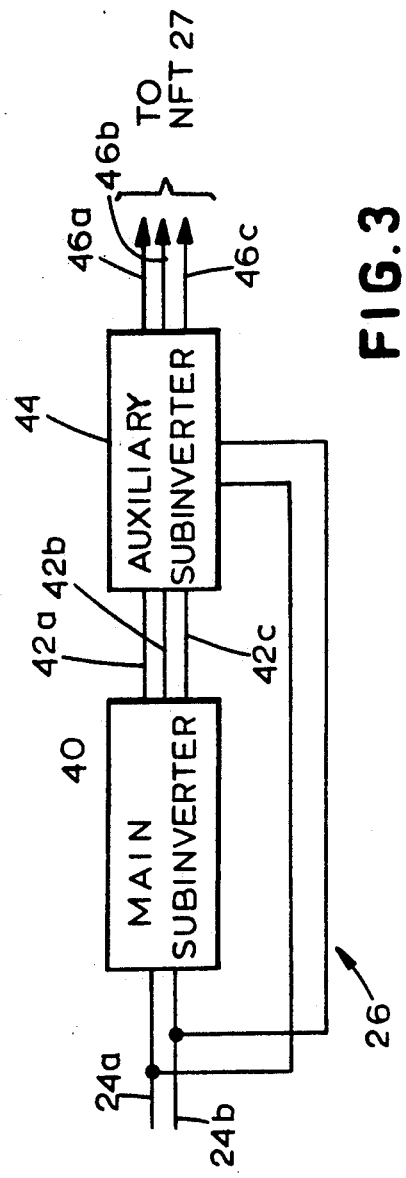
FIG. 3 comprises a block diagram of the DC/AC converter of FIG. 2 according to the present invention.

Referring now to FIG. 3, the DC/AC converter 26 includes a main subinverter 40 having inputs coupled to the DC link conductors 24a, 24b and a series of outputs 42a–42c. The main subinverter 40 develops a first set of stepped or multi-state waveforms each having a series of N steps during each cycle thereof. Preferably, the main subinverter 40 comprises a 6-step inverter wherein three-phase 6-step output voltages are produced at the outputs 42a–42c.

The inverter 26 further includes an auxiliary subinverter 44 having inputs coupled to the outputs 42a–42c of the main subinverter 40. The auxiliary subinverter 44 develops a series of cycles of a second set of stepped or multi-state output waveforms at a series of outputs 46a–46c wherein each output waveform has a number of steps greater than N during each cycle thereof. Preferably, the second set of output waveforms comprise three-phase, 12-step voltages that are supplied to the filter 28. The composite waveforms may include a different number of steps per cycle, if desired. It should be noted that the term 12-"step", as used herein, refers to the fact that each cycle of each output waveform is subdivided into 12 30° portions wherein each portion assumes a particular level which may be the same or different than the level of adjacent portions.

The auxiliary subinverter 44 may receive DC power from the DC link 24, or may receive DC power from another source, as desired.

Figure 4:
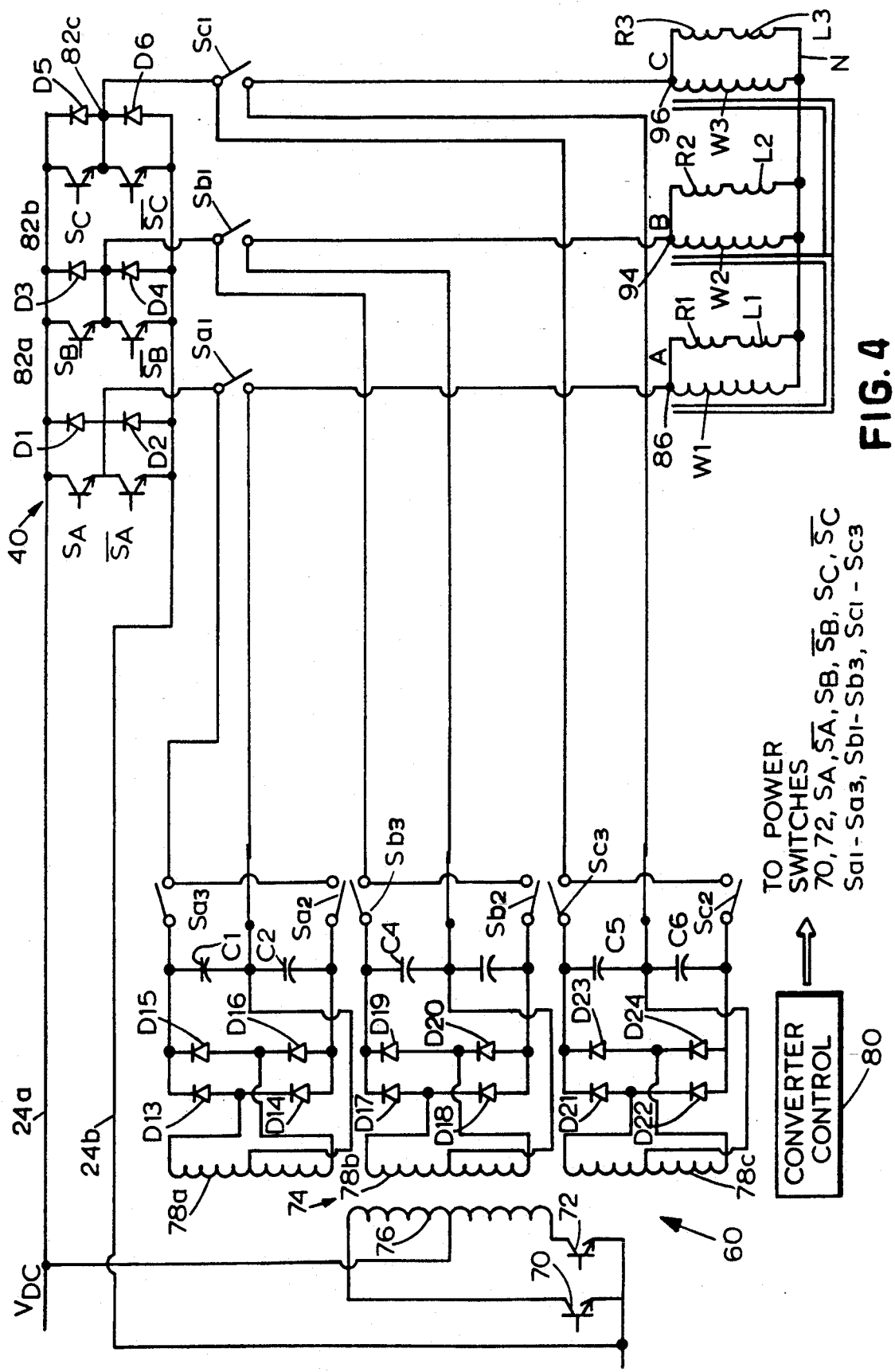
FIG. 4 is a simplified schematic diagram of the DC/AC converter of FIGS. 2 and 3.

Referring now to FIG. 4, the main subinverter 40 includes six power switches in the form of conventional bipolar transistors or insulated gate bipolar transistors $S_A$, $\overline{S}_A$, $S_B$, $\overline{S}_B$, $S_C$ and $\overline{S}_C$ together with associated flyback diodes D1–D6 connected thereacross in antiparallel relationship, respectively. The power switches and flyback diodes are connected in a conventional three-phase bridge configuration across the first and second DC link conductors 24a, 24b.

It should be noted that the NFT 27, filter 28 and the loads coupled to the AC load bus 14 are represented by lumped impedances illustrated as windings W1–W3, resistors R1–R3 and inductors L1–L3.

Figure 5A:
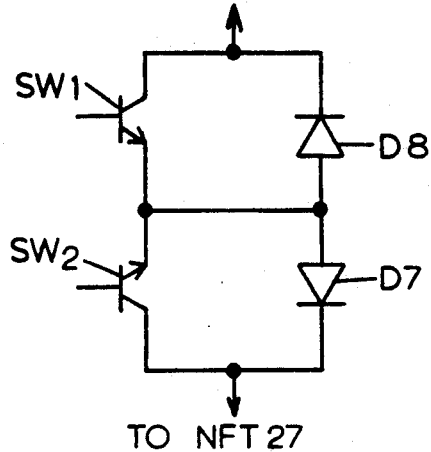
FIGS. 5A and 5B are schematic diagrams of alternative designs for the bidirectional switches of FIG. 4.

The auxiliary inverter 44 includes 9 bidirectional switch assemblies $S_{a1}$–$S_{a3}$, $S_{b1}$–$S_{b3}$ and $S_{c1}$–$S_{c3}$ which are coupled between a DC/DC converter 60 and the NFT 27. The bidirectional switch assemblies are identical, and hence only the assembly $S_{a1}$ will be described in detail. As seen in FIG. 5A, the bidirectional switch assembly $S_{a1}$ comprises first and second power switches SW1 and SW2 and first and second diodes D7, D8 associated with the first and second power switches, respectively. The first power switch SW1, when on, and the first diode D7 permit current flow in one direction whereas the second power switch SW2, when on, and the second diode D8 permit current flow in the opposite direction.

Figure 5B:
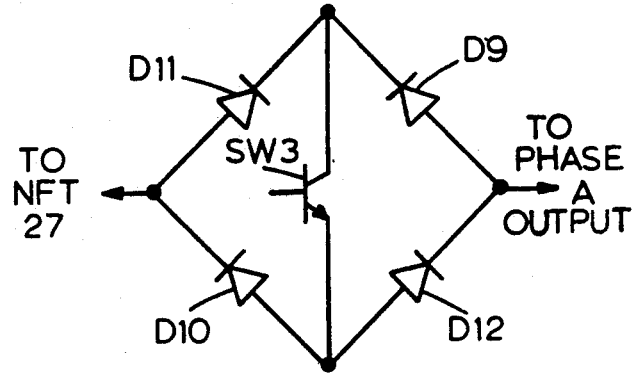

Alternatively, as seen in FIG. 5B, the bidirectional switch assembly may comprise a power switch SW3 connected across a diode bridge comprising power diodes D9–D12. The power switch SW3, when on, permits current flow in one direction via the diodes D9 and D10, or in a second direction via diodes D11 and D12.

Referring again to FIG. 4, the DC/DC converter 60 may be of any suitable type that develops a plurality of voltage levels. In the preferred embodiment, the DC/DC converter 60 includes a pair of power switches 70, 72, a transformer 74 including a center-tapped primary winding 76 coupled between the DC link conductor 24a and the power switches 70, 72 and three center-tapped secondary windings 78a, 78b, 78c. The DC/DC converter 60 further includes diodes D13–D24 and capacitors C1–C6. Mid-points 79a, 79b and 79c between the capacitors C1 and C2, C3 and C4, C5 and C6, respectively are coupled to the center taps of corresponding secondary windings 78a, 78b, 78c and to the respective phases of the NFT 27. The power switches 70, 72 are operated by a converter control 80 to produce AC power in the primary winding 76. Corresponding secondary AC voltages are produced across the secondary windings 78a–78c and are converted into DC voltages by the diodes D13–D24 and the capacitors C1–C6. In the preferred embodiment, the voltages developed across the capacitors C1–C6 are substantially equal to $V_{DC}$, where $V_{DC}$ equals the voltage across the DC link conductors 24a, 24b.

The switch assemblies $S_{a1}$–$S_{a3}$, $S_{b1}$–$S_{b3}$ and $S_{c1}$–$S_{c3}$ selectively couple the voltages developed across the capacitors C1–C6 to the voltages developed at phase outputs 82a, 82b and 82c of the main subinverter 40.

Figure 6:
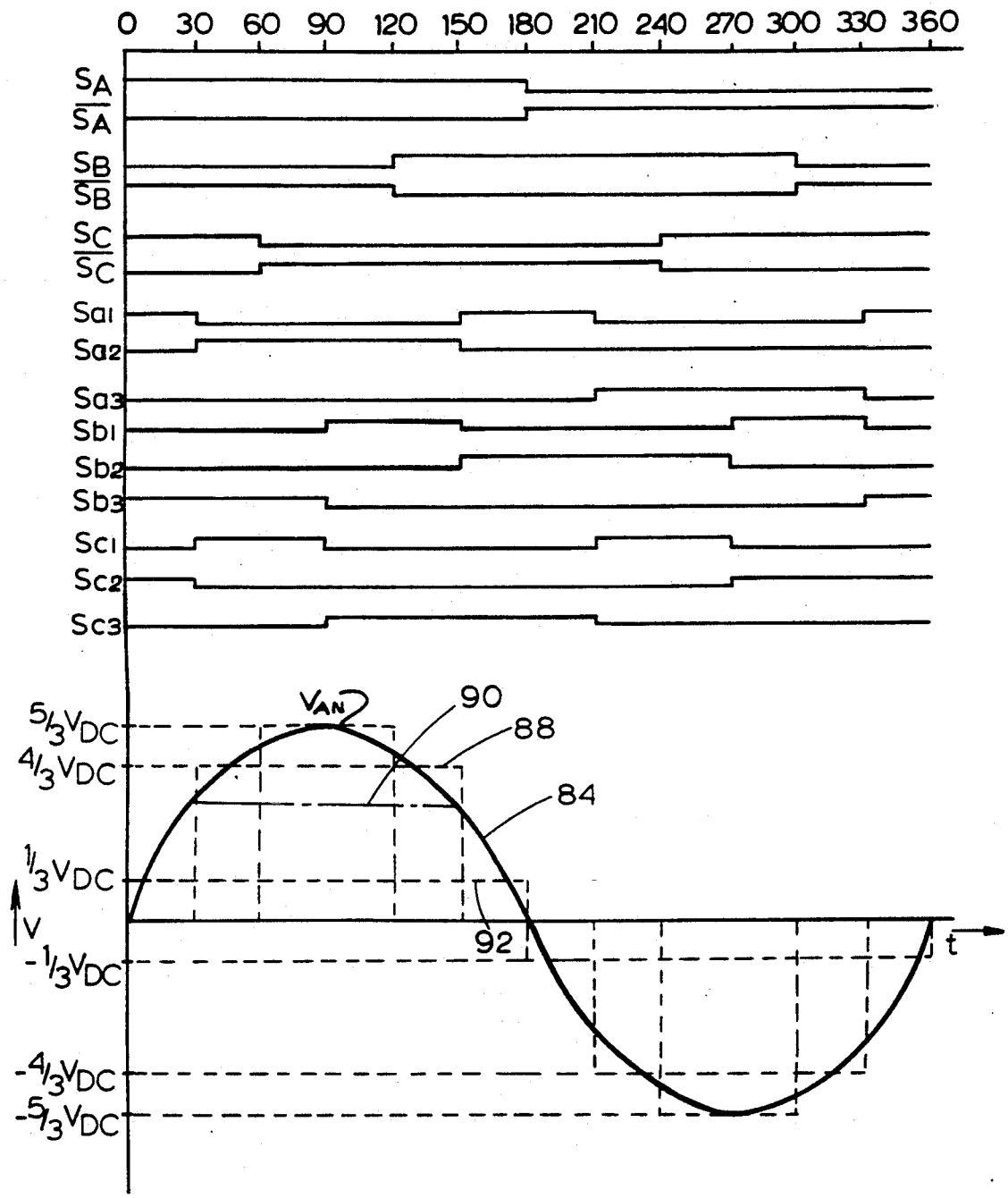
FIG. 6 comprises a series of waveform diagrams illustrating the operation of the converter of FIG. 4.

More particularly, the waveform diagrams of FIG. 6 illustrate the operation of the circuitry of FIG. 4. In the waveform diagrams, a high state signal for one of the power switches, for example, the switch assembly $S_{a1}$, indicates turn on or closure thereof whereas a low state signal indicates turn off or opening of such switch assembly. The waveform diagrams illustrate 360° or one cycle of the output of the main subinverter 40 together with the phase A output waveform 84 after filtering by the filter 28. The stepped waveform 88 illustrated in the figure is the voltage produced at a point 86 relative to a neutral voltage N by the main and auxiliary subinverters 40, 44 without filtering.

The waveforms of FIG. 6 will be explained with particular reference to the operation of the switches of the main subinverter 40 and the switches $S_{a1}$–$S_{a3}$ to produce the waveform 88. It should be understood that the operation of the remaining switches and switch assemblies is generally identical to the operation described hereinafter, with the exception that the operation of switches and switch assemblies associated with the phase B phase output 82b is phase displaced 120° relative thereto, and that the operation of the switches associated with the phase C output 82c is phase displaced 240° relative thereto.

With reference to FIG. 6, at the zero degree point in the waveform, the switches $S_A$, $\overline{S}_B$ and $S_C$ are closed and the switches $\overline{S}_A$, $S_B$ and $\overline{S}_C$ are opened. The switches $S_A$ and $\overline{S}_A$ remain in these states until the 180° point in the output waveform. The switches $S_B$ and $\overline{S}_B$ change states at the 120° and 300° degree points while the switches $S_C$ and $\overline{S}_C$ change states at the 60° and 240° points. Also, between 0° and 30°, the switches $S_{a2}$ and $S_{a3}$ are opened while the switch $S_{a1}$ is closed. As seen in FIG. 4, this sequence of switching causes the voltage on the DC bus conductor 24a to be delivered through the switch $S_A$ to the point 86. During this time, the waveform 88 is at a level substantially equal to $\frac{1}{2} V_{DC}$ (in the waveforms 84 and 88, the voltage drops across the switches and diodes are ignored).

At the 30° point, the switch assembly $S_{a2}$ is closed while the switch $S_{a1}$ is opened. Thus, between 30° and 60°, the voltage $\frac{1}{3} V_{Dc}$ developed at the phase output 82a is augmented by the voltage $V_{DC}$ developed across the capacitor C2 and hence the level of the waveform 88 rises to a level substantially equal to 4/3 $V_{DC}$. Between 60° and 120°, the voltage developed at the phase output 82a rises to ⅔ $V_{DC}$ and hence the level of the waveform 88 rises to 5/3 $V_{DC}$. Between 120° and 150°, the voltage at the phase output 82a drops to ⅓ $V_{DC}$ and hence the level of the waveform 88 drops by a corresponding amount to 4/3 $V_{DC}$.

At the 150° point, the switch $S_{a1}$ is again turned on while the switches $S_{a2}$ and $S_{a3}$ are turned off. Thus, the voltage ⅓ $V_{DC}$ produced at the phase output 82a is delivered directly to the point 86.

In the second half-cycle (i.e. between 180° and 360°) the switch $S_{a1}$ is turned on between 180° and 210° and between 330° and 360° while the switch $S_{a3}$ is turned on between 210° and 330° and the switch $S_{a3}$ is turned off. Thus, the voltage $-$⅓ $V_{DC}$ produced at the phase output 82a is delivered directly to the point 86 between 180° and 210° and between 330° and 360°. Further, between 210° and 240° and between 300° and 330°, the voltage ⅓ $V_{DC}$ produced at the phase output 82a is augmented (in a negative sense) by the voltage across the capacitor $C_1$ to cause the level of the waveform 88 to be substantially equal to $-$4/3 $V_{DC}$. Between 240° and 300°, the voltage $-$⅔ $V_{DC}$ produced at the phase output 82a is increased (again, in a negative direction) by the voltage $V_{DC}$ across the capacitor C1 so that the level of the waveform 88 is substantially equal to $-$5/3 $V_{DC}$.

It can be seen that the auxiliary subinverter 44 develops an output waveform 90 (illustrated in dashed lines in FIG. 6) which is summed or combined with the phase output 92 (illustrated in dot-dash form) developed at the terminal 82a. The result is the voltage waveform 88 which, as noted previously, is filtered to obtain the waveform 84.

Also, as previously noted, waveforms substantially identical to the waveform 88 are produced at points 94, 96 referenced to the neutral voltage N except that these waveforms are displaced 120° and 240°, respectively, relative to the waveform 88. Also, these waveforms are filtered to produce substantially sinusoidal waveforms like the waveform 84 with the necessary 120° and 240° phase displacements.

It should be noted that the design of the converter 80 to operate the switches in the subinverters 40, 44 is straightforward and hence will not be described further, it being understood that such design is well within the capability of one of ordinary skill in the art.

Figure 7:
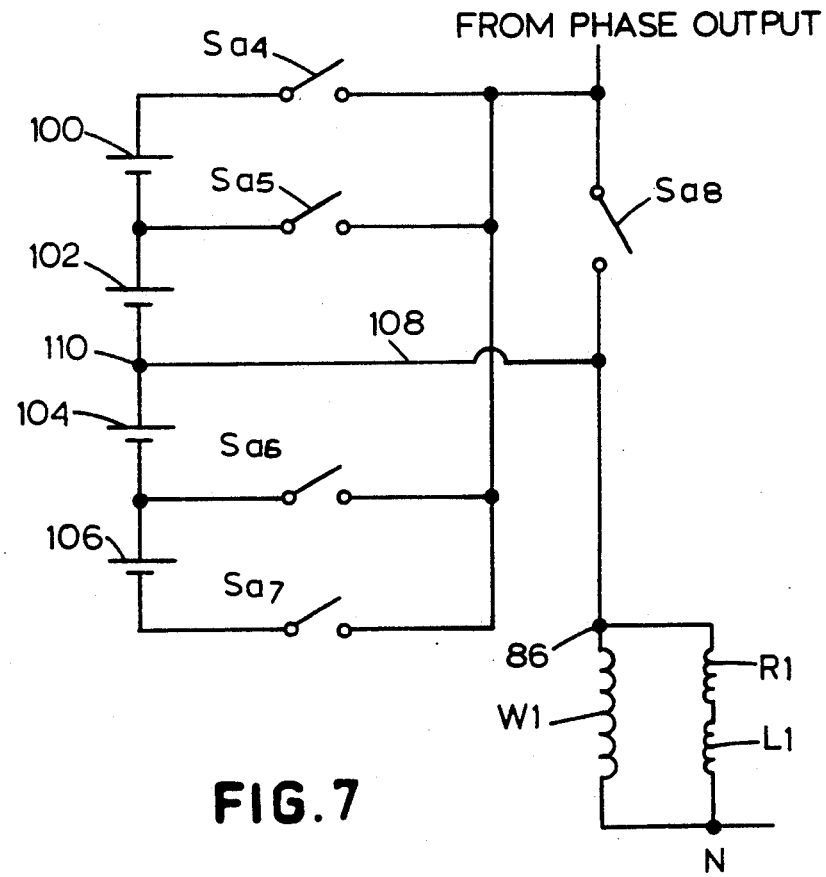
FIG. 7 is a simplified schematic diagram of a portion of an alternative DC/AC converter that may be used in place of the converter shown in FIG. 4.

Also, it should be noted that a greater number of steps may be produced in each phase output through the addition of further switch assemblies and by suitably increasing the number of voltages developed by the DC/DC converter 60. With specific reference to FIG. 7, the DC/DC converter 60 is illustrated as including first through fourth DC voltage sources 100-106. The voltage sources 100-106 may, in reality, comprise a transformer, rectifier bridge and four series-connected capacitors connected across the rectifier bridge, analogous to the design of the DC/DC converter 60 of FIG. 4. Switch assemblies $S_{a4}$-$S_{a7}$ selectively connect the voltage sources 100-106 to the phase output 82a of the main subinverter 40. A switch assembly $S_{a8}$, like the switch assembly $S_{a1}$, is connected between the phase output 82a and the point 86. As before, the point 86 is connected by a line 108 to a mid-point voltage developed at a point 110.

The switch assemblies $S_{a4}$-$S_{a8}$ are operated in a fashion analogous to the switch operation described previously in connection with the embodiment of FIG. 4 and as shown in the waveform diagrams of FIG. 6 to produce a 24-step waveform. In this case, the voltage magnitudes represented by the voltage sources 100-106 are selected to provide the proper output voltage levels. A greater number of steps (for example, 36-six step or 48-step) may be produced in the output through the suitable addition of further voltages each of selected magnitude by the DC/DC converter 60 and further switch assemblies, as should be obvious to one of ordinary skill in the art.

It should be noted that the DC/DC converter 60 may be replaced by a different DC to DC converter, if desired. For example, a conventional H-bridge design that utilizes a primary winding connected to the junctions between series connected power transistors wherein diagonally opposite power switches are operated simultaneously may be utilized. Further alternative designs are readily apparent to one of ordinary skill in the art.

The present invention is not limited to use with polyphase inverters of the type illustrated in the Figures. Rather, the outputs of first and second controllable switches that are coupled between a DC conductor and an inverter output may be combined wherein the first controllable switch is operated by a control to produce a first AC waveform which changes between two different levels at a first time and wherein the second switch is operated to produce a second AC waveform which changes between two different levels at a second time different from the first time. The first and second waveforms are combined to form a composite AC waveform which assumes three different levels during a cycle of the AC power. Preferably, although not necessarily, the second switch is operated by the control at a frequency greater than the frequency of operation of the first switch.

The inverter of the present invention does not require the use of a summing transformer; rather, the present invention obviates the need for such a transformer by utilizing a relatively greater number of switches together with the transformer 74. The size and weight of the transformer 74 can be reduced by operating the switches 70 and 72 at a high frequency so that the combined size and weight of the transformer and added switches is substantially less than the size and weight of the summing transformer which would otherwise be necessary. A desirable savings in size and weight is therefore realized.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. An inverter for converting DC power supplied on DC conductors into AC power at an inverter output wherein the AC power has a series of cycles, comprising:

a main subinverter having a first static switch which is operated to convert the DC power into a first multi-state AC waveform at a main subinverter output; and an auxiliary subinverter having a second static switch coupled between the main subinverter output and the inverter output, a DC/DC converter having an input coupled to a source of DC potential and an output coupled to the inverter output and a third static switch coupled between the main subinverter output and the output of the DC/DC converter;

wherein the second and third static switches are closed at least once during each cycle of the AC power.

2. An inverter for converting DC power supplied on a DC conductor into AC power having a series of cycles, comprising:

a first controllable switch coupled between the DC conductor and an inverter output;

a second controllable switch coupled between the DC conductor and an inverter output;

means for operating the switches such that the first switch produces a first AC waveform that changes between different levels at a first time and such that the second switch produces a second AC waveform that changes between different levels at a second time different from the first time;

means for combining the first and second AC waveforms to form a composite AC waveform which assumes three different levels during a cycle of the AC power; and a DC/DC converter coupled between the DC conductor and the second controllable switch which converts the DC power on the DC conductor into suplemental DC power;

wherein the first waveform assumes first and second levels and the second waveform assumes third and fourth levels, the fourth level being different from the first and second levels.

3. The inverter of claim 2, wherein the operating means includes means for operating the first switch at a first frequency and the second switch at a second frequency greater than the first frequency.

4. The inverter of claim 2, wherein the operating means operates the second switch to produce multiple pulses during the cycle of the AC power.

5. An inverter for converting DC power supplied on DC conductors into AC power, comprising:

a main subinverter having inputs coupled to the DC conductors and an output and developing a series of cycles of a first multi-state AC waveform having a series of N steps during each cycle thereof;

wherein the main subinverter includes six power switches connected in a three-phase bridge configuration and wherein the first multi-state AC waveform has a series of six steps during each cycle thereof;

an auxiliary subinverter having an input coupled to the main subinverter output and developing a series of cycles of a second multi-state output waveform;

wherein the first and second AC waveforms are combined to produce a series of cycles of a composite multi-state waveform having a number of steps greater than N during each cycle thereof; and a DC/DC converter, coupled between the DC conductors and the second controllable switch, that converts the DC power on the DC conductor into supplemental DC power and wherein the first waveform assumes first and second levels and the second waveform assumes third and fourth levels, the fourth level being different from the first and second levels.

6. The inverter of claim 5, wherein the DC/DC converter produces two DC voltage levels and there are three bidirectional auxiliary subinverter switches.

* * * * *